United States Patent [19]

Arvai

[11] Patent Number: 4,544,483
[45] Date of Patent: Oct. 1, 1985

[54] DYNAMIC, REVERSE-FLOW OIL PURIFIER DEVICE

[75] Inventor: Ernest P. Arvai, Hamden, Conn.

[73] Assignee: Puratrol, Inc., Bridgeport, Conn.

[21] Appl. No.: 588,623

[22] Filed: Mar. 12, 1984

[51] Int. Cl.[4] .............................................. B01D 29/34
[52] U.S. Cl. .................... 210/316; 210/339; 210/438; 210/451; 210/512.1
[58] Field of Search ............... 210/788, 799, 801, 339, 210/416.5, 438, 439, 450, 512.1, 521, 533, 314, 316

[56] References Cited

U.S. PATENT DOCUMENTS

| | | | |
|---|---|---|---|
| 1,742,281 | 1/1930 | Rundlett | 210/801 |
| 2,720,278 | 10/1955 | Wiley | 210/801 |
| 3,339,740 | 9/1967 | Starzyk | 210/512.1 |
| 3,370,408 | 2/1968 | Lehrer et al. | 210/512.1 |
| 3,399,770 | 9/1968 | Salomon | 210/788 |
| 3,406,825 | 10/1968 | Schouw | 210/788 |
| 3,771,290 | 11/1973 | Stethem | 210/512.1 |
| 3,797,203 | 3/1974 | Murdock, Sr. | 210/521 |
| 4,199,443 | 4/1980 | Tauber | 210/512.1 |
| 4,364,833 | 12/1982 | Loegering | 210/521 |

Primary Examiner—Richard V. Fisher
Assistant Examiner—Wanda L. Millard
Attorney, Agent, or Firm—H. Gibner Lehmann; K. Gibner Lehmann

[57] ABSTRACT

A low-cost, mass-produced oil purifier of plastic, utilizing reverse internal currents to remove impurities, has a sealed housing with upper and lower parts that interfit. The lower housing part has a circular base and a central, upright standpipe open at top and bottom, that is provided with exterior ledges at different levels on which perforated discs are supported. The upper housing part comprises an inverted shell fitted to the base of the lower part, and having an inverted cup depending from its top wall and surrounding the top of the standpipe. At one side of the inverted cup is an oil inlet on the upper housing part. The top perforated disk imparts a swirl to the incoming oil, which passes downward through the disks to a settling chamber at the bottom, and then in a purified state upward through the disks again to the open top of the standpipe, thence down through the standpipe and out at the bottom of the latter.

18 Claims, 12 Drawing Figures

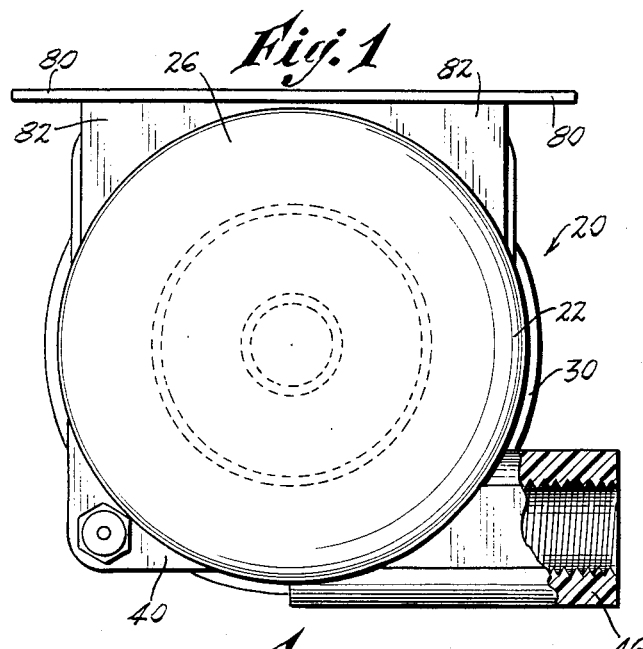
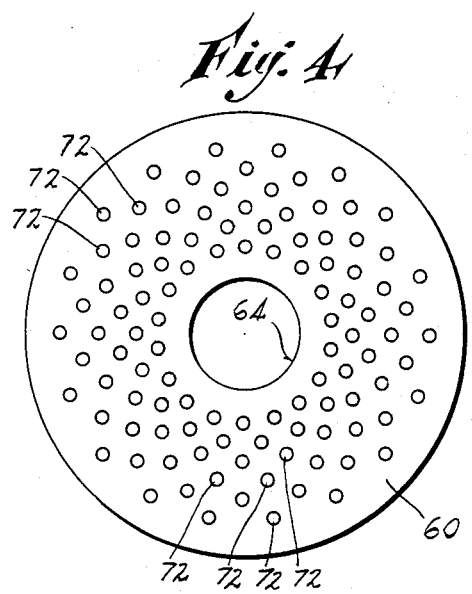
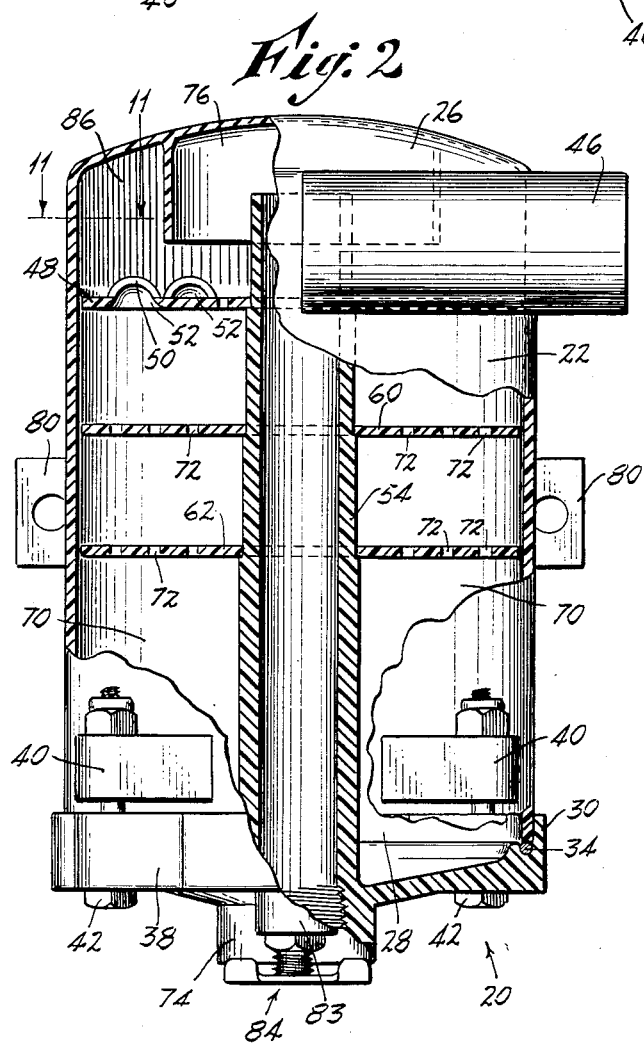
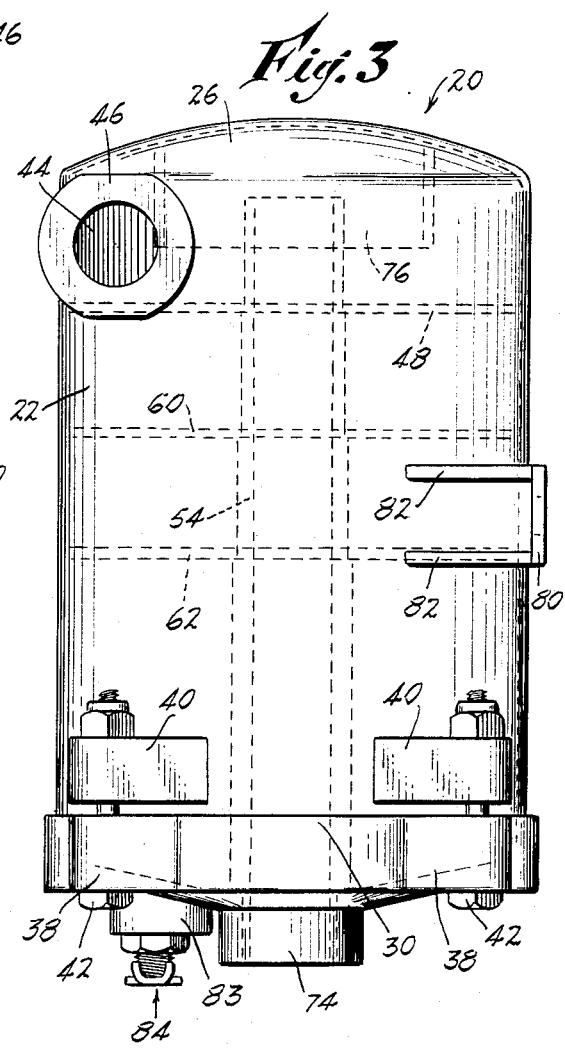

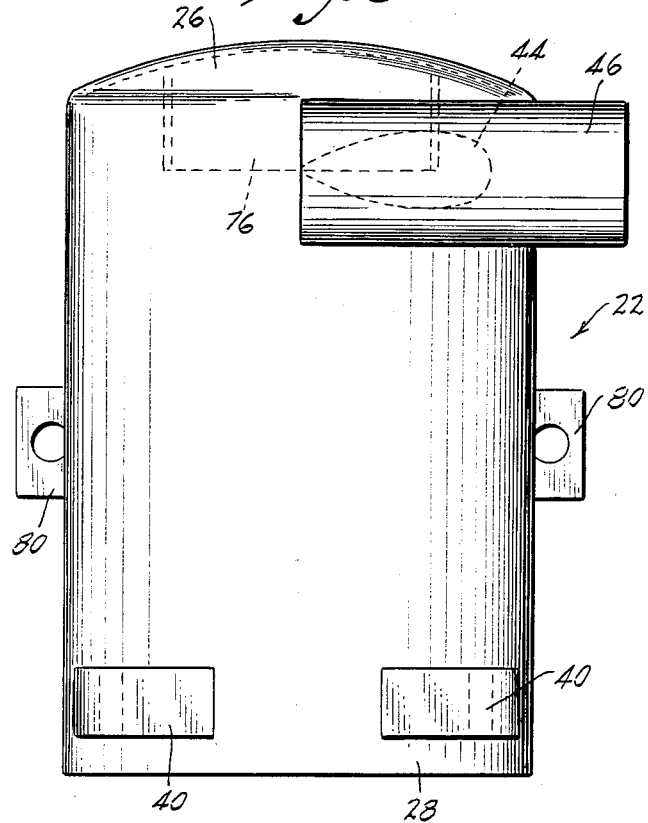
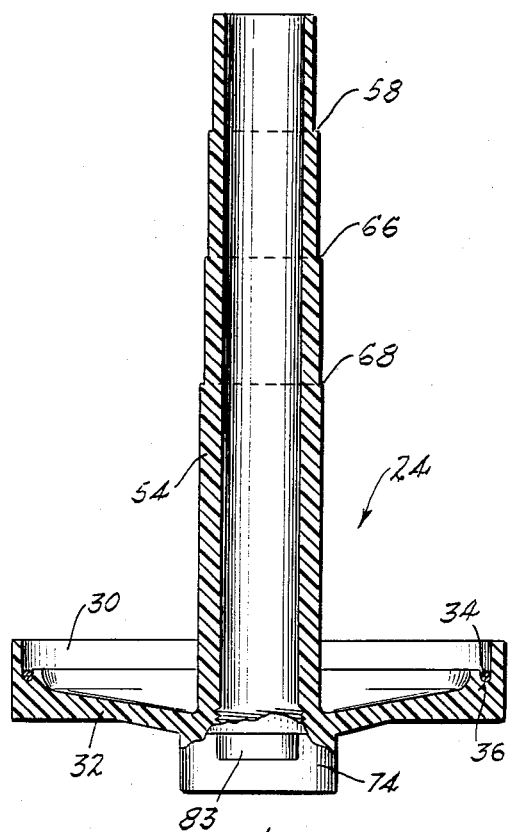
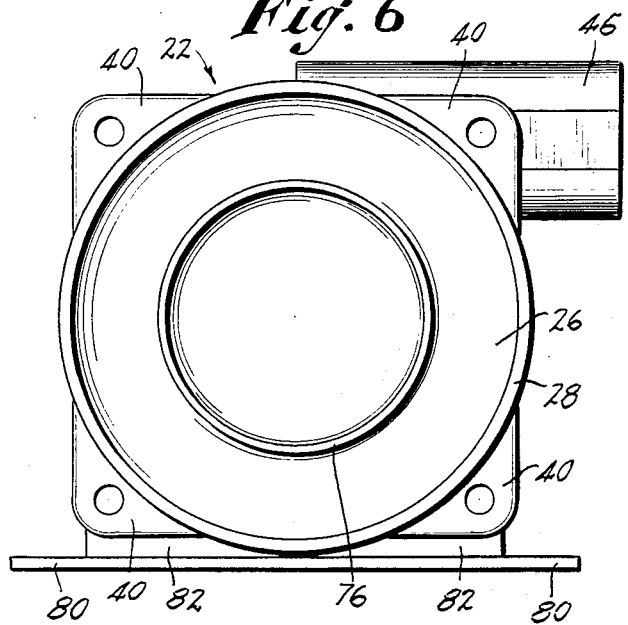
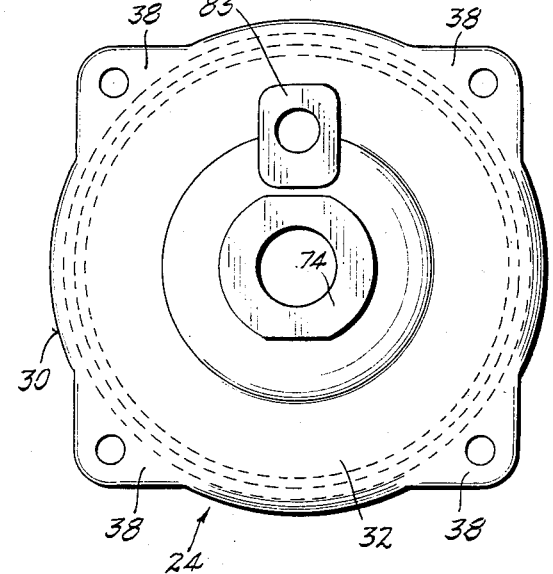

DYNAMIC, REVERSE-FLOW OIL PURIFIER DEVICE

BACKGROUND

This invention relates to oil purifiers which have oil fed to them, such as in-line purifiers for oil circulating in the lubrication, field or other system of a piece of equipment, or oil and water sucked up from a spill and discharged from a pump.

In the past quite a number of different oil filters and similar oil-purifier devices have been proposed and produced. Many of these have comprised filtering elements such as porous sheets, films and cylinders made of paper, cloth, felt or other materials which after a period of use become clogged with impurities and require removal and replacement. Other types of purifiers employ centrifugal force and swirling movements of the oil to effect a separation of heavier impurities including metal particles, water, dirt, etc. from the oil, leaving the latter in a cleaner condition without impairing the lubricating qualities of the same.

The replacement of filter elements which become clogged is costly and time-consuming, as well as being messy and inconvenient. In some instances, the filter elements still have a useful span of time remaining whereby their removal constitutes a wasteful practice.

Purifiers which do not rely on replacement cartridges have drain fittings whereby impurities removed from the oil can be periodically taken out. Such arrangement obviates the disadvantages of the removable cartridge type of filter to a degree, but instead there are ordinarily necessitated numerous, complicated and costly components in the purifier housing, to effect the desired purification. Such devices are also labor-intensive in that considerable expense is represented by the labor needed to assemble the device.

In some instances, movable parts are incorporated in the purifier, and these tend to malfunction after a period of use, rendering the device inoperative whereby replacement of the unit is usually required.

SUMMARY

The above disadvantages and drawbacks of prior oil filtering and purifying devices are obviated by the present invention, which has for one object the provision of a novel and improved oil purifier which is especially low in manufacturing cost while at the same time being particularly effective in the purification process.

Another object of the invention is to provide an improved oil purifier device as above set forth, which obviates the need for removal and replacement of clogged cartridges and the like and instead has provision for drawing off impurities periodically without dismantling of the unit.

A further object of the invention is to provide an improved oil purifier device in accordance with the foregoing, which is entirely devoid of moving parts and accordingly not likely to malfunction due to impairment of movements of components.

Still another object of the invention is to provide an improved oil purifier device as above characterized, wherein internal reverse oil currents are utilized in the purification process, to effect the cleaning of the oil.

Yet another object of the invention is to provide an improved oil purifier of the kind outlined above, which can be economically fabricated mostly from plastic materials whereby the components can be mass produced in molds and require no costly finishing operations of any kind whatsoever.

A still further object of the invention is to provide an improved oil purifier device of the kind indicated, wherein the fewest possible components are required, and wherein the components which are utilized comprise simple constructions that can be readily fabricated.

A feature of the invention resides in the provision of an improved oil purifier as above described, which can be readily dismantled, if necessary, for inspection or other purposes and easily re-assembled to restore its original, operative condition.

Another feature of the invention is the provision of a novel oil purifier as set forth, wherein unique guide and movement-controlling means are utilized to transfer and reversely-flow the oil to various locations where it is acted on by centrifugal force and gravity, thereby to effect the desired purification and removal of the impurities thereof.

Still other features and advantages will hereinafter appear.

The above objects are accomplished by an oil purifier device comprising a sealed housing having upper and lower interfitting parts, the upper housing part having an oil inlet port and an external fitting connected thereto for the purpose of introducing oil into the housing. Adjoining the inlet port are means in the form of a horizontal swirl plate which imparts a swirling movement to the oil, tending to force it radially outward and also downward to the lower part of the housing. The lower housing part has an upright, central standpipe which is open at both the top and the bottom, and which extends closely adjacent the top wall of the housing, supporting the swirl plate thereat. Surrounding the open top of the standpipe is an inverted cup structure which functions to effect a separation of the swirling input oil from rising settle-purified oil surrounding the standpipe. On the standpipe are supported a number of perforated baffle plates through which the oil flows, both in a downward direction and also in an upward direction. These baffle plates constitute guide means, since the perforations thereof guide and control the downward and also the upward flow of the oil through the housing. The lower portion of the housing comprises a large settling chamber, where the oil flow is slowed and impurities can settle out. From the settling chamber the oil rises at locations mostly surrounding the standpipe, and can flow into the open top of the standpipe and thence downward, to be discharged at the open bottom. The lower housing part has a threaded fitting to accommodate a cooperable fitting in an oil line, for effecting the return of purified oil to the lubrication system.

In the accompanying drawings, illustrating one embodiment of the invention:

FIG. 1 is a top plan view of the oil purifier device of the invention, with a portion broken away and shown in section to reveal further details.

FIG. 2 is a view partly in side elevation and partly in axial section, of the oil purifier device.

FIG. 3 is a side elevational view of the oil purifier device, looking from the right of FIG. 2.

FIG. 4 is a top plan view of one of the baffle plates of the oil purifier.

FIG. 5 is a side elevation of the upper housing part of the oil purifier device.

FIG. 6 is a top plan view of the upper housing part of FIG. 5.

FIG. 7 is a view mostly in axial section and partly in side elevation, of the lower housing part of the oil purifier.

FIG. 8 is a bottom plan view of the lower housing part of FIG. 7.

Figure 9:
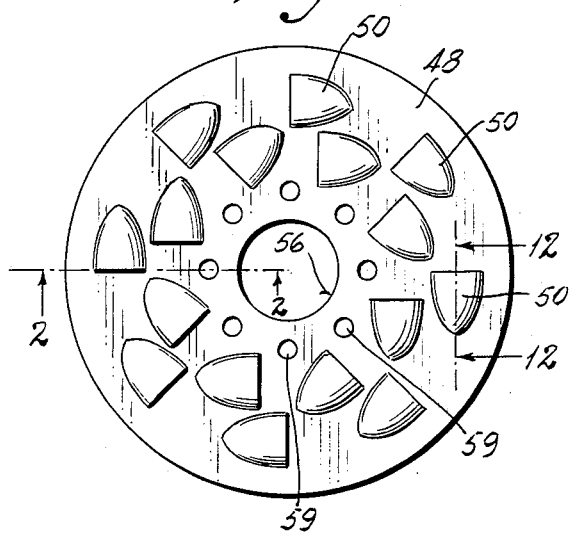
FIG. 9 is a top plan view of the swirl plate of the oil purifier.
Figure 10:
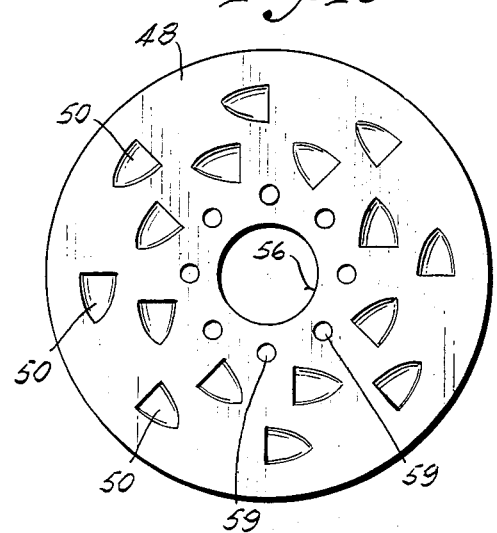
FIG. 10 is a bottom plan view of the swirl plate of FIG. 9.
Figure 11:
FIG. 11 is a fragmentary section, taken on the line 11—11 of FIG. 1.
Figure 12:
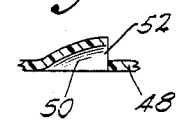
FIG. 12 is a fragmentary section, taken on the line 12—12 of FIG. 9.

As shown, the improved oil purifier device of the invention comprises a two-part cylindrical housing formed entirely of plastic substance and designated generally by the numeral 20, said housing having an upper part 22 (FIGS. 5 and 6) and a lower part 24 (FIGS. 7 and 8). The upper housing part 22 is in the form of an upright cylinder having a top wall 26 shaped like a rounded dome, having an upper inside wall with ribs 86 and having a circular bottom edge 28 which constitutes one of two cooperable peripheral joining portions of the housing parts. The other cooperable joining portion comprises the periphery 30 of a circular base or bottom wall 32 of the lower housing part 24. Such periphery is in the form of an upstanding flange that is adapted to telescopically receive the circular bottom edge 28 of the upper housing part. An O-ring 34 is seated in an annular groove 36 of the base 32, and engages the bottom edge 28 to effect a seal between the two housing parts.

To securely fasten the two housing parts in assembled and sealed relation, the base 32 of the lower housing part 24 has a plurality of apertured lugs 38 which align with cooperable apertured lugs 40 of the upper housing part, and bolts 42 pass through the lugs and are tightened to pull the bottom edge 28 into sealing engagement with the O-ring 34.

As shown, the lugs 40 on the upper housing part 22 are disposed a distance above the bottom edge portion 28 of said part, to enable an advantageous cooperation between the cooperable peripheral joining portions 28, 30 of the housing parts. The upstanding flange 30 constituting one of the joining portions reinforces and guides the bottom edge portion 28, and insures proper alignment of the same with the O-ring 34, as can be seen in FIG. 2. The lugs 38 of the lower housing part are advantageously incorporated as an integral part of the flange 30.

The upper housing part has an oil inlet port 44 which communicates with an internally threaded boss 46 that is tangentially disposed at the upper portion of the housing part and extends in a horizontal direction, as seen in FIGS. 2 and 5 thereby to direct the entering oil across the ribs 86 of the upper inside wall so as to impart a swirling movement to the oil in a circular path. The boss 46 is adapted to receive the threaded male fitting (not shown) of an oil pipeline comprising part of the lubrication system of an engine or other piece of equipment.

In accordance with the invention, the rib means 86 in the upper housing part 22 imparts a swirling movement to oil which is entering through the inlet port 44, such means also tending to direct the entering oil in a circular path. This swirling is aided by oil guide means comprising a thin apertured swirl plate 48 having tunnel-like formations 50 forming openings 52 which all face in the same circumferential direction and accept the inflowing oil. Also, as provided by the invention, a straight open-top-end and open-bottom-end oil discharge standpipe 54 is provided supported by and on the lower housing part 24, extending upward from the base or bottom wall 32 thereof to a point adjacent the top wall 26 of the upper housing part 24. The swirl plate 48 is fixedly positioned on the standpipe 54 which passes through a central opening 56 in the plate. Positioning of the plate 48 is effected by an annular external shoulder 58 on the standpipe, as seen in FIG. 7.

The standpipe 54 also carries guide means for the oil, in the form of a plurality of plain openings 59 which extend around the central opening 56 in the swirl plate 48, and also in the form of thin apertured vertically-spaced baffle plates 60 and 62 which have central openings such as the opening 64 in the plate 60 illustrated in FIG. 4. The plate 60 rests on an annular external shoulder 66 of the standpipe 54, and the plate 62 rests on an annular external shoulder 68 of the standpipe.

The baffle plates 60 and 62, surrounding the standpipe 54, guide the swirling entering oil downward into the lower housing area, to a settling chamber 70 which constitutes a large volumetric fraction of the entire space within the housing. At the same time, the baffle plates reduce the swirling movement of the oil, whereby a settling of the impurities can occur in the chamber 70. For this purpose, the baffle plates 60 and 62 have a multiplicity of small openings, designated 72, which pass the oil downward and also upward, this latter movement occuring in areas closely surrounding the standpipe 54 mainly at the upper portion thereof as at present understood, whereby such upwardly moving oil can enter the top end of the standpipe and pass downward therethrough to be discharged at the bottom wall 32 of the housing. For this purpose, the bottom wall 32 of the lower housing part has an internally threaded boss 74 which communicates with the interior of the standpipe and which is adapted to receive a male threaded fitting on the lubrication pipeline of the equipment.

In accordance with the invention, oil-confining means are provided at the upper or top end of the standpipe 54, tending to keep separate the swirling inlet oil from the rising, settle-purified discharging oil that is entering the open top end of the standpipe. This confining means comprises an inverted cup structure 76 which is carried by the top wall 26 of the upper housing part and which surrounds the open top end of the standpipe 54, such cup structure being preferably integrally molded with the top wall 26 at the time of forming of the housing part. I have found that a desirable relationship between the inverted cup structure 76 and the standpipe 54 exists when the open top end of the pipe is disposed about halfway into the inverted cup structure, inasmuch as such disposition appears to be effective in maintaining the desired separation of the impure and purified oil streams, one after entering the port 44 and being swirled by the swirl plate 48 and the other rising through the small openings 59 of the swirl plate, disposed around the standpipe 54 closely adjacent the large central opening 56 of the plate. Also, I have found that it is advantageous to locate the swirl plate 48 a predetermined distance below the bottom rim of the inverted cup structure 76 which distance is roughly equal to the extent of insertion of the standpipe into the cup structure.

State another way, the lower edge or rim of the inverted cup structure is preferably disposed substantially at a level that is midway between the open top end of the standpipe 54 and the swirl plate 48. The cup means 76 extends downward toward and past the upper or top end of the standpipe 54.

The oil purifier device can be advantageously mounted on a vertical supporting surface, by the provision of a pair of apertured mounting lugs 80 which lie in a plane that is tangential to the wall of the upper housing part 22. For reinforcement purposes, horizontal webs 82 provide additional connections between the lugs 80 and the cylindrical wall of the housing part 22.

For removing the settled sludge and other impurities which have collected in the settling chamber 70, an internally threaded clean-out boss 83 is provided in the bottom wall 32 of the lower housing part 24, said boss carrying a usual type of threaded valve 84 of the kind having a bored threaded shank for the discharge flow.

Referring to FIG. 2 it will be seen that the center of the inlet port, considered horizontally, is below the open top end of the standpipe 54, and this has been found to be a desirable relationship whereby impure oil is prevented in most part from flowing immediately out through the standpipe, before passing downward in the housing and being subjected to the settling and purifying process, whereas the purified oil flowing upward around the exterior of the standpipe will, with the least disturbance, pass into the top open end of the pipe, for downward flow therethrough and discharge from the outlet boss 74.

Also, the bottom edge or rim of the inverted separator cup structure 76 is substantially at the same mean horizontal level as the center of the inlet port 44 measured horizontally and is thus at a level above the bottom area of the oil inlet port 44, and below the top end of the standpipe 54, which latter is free of and unattached to the cup means 76. The cup means 76 has a wall which is only partially interposed between the open top end of the discharge pipe 54 and the oil inlet port 44 whereby a direct but restricted path for flow exists between said open top end and a portion of said oil inlet port. The upper portions of the cup means 76 define a confined area for the rising, settle-purified oil which is to be discharged, said confined area being disposed above and in surrounding relationship to the open top end of the oil discharge pipe 54. With this arrangement, cross-flow between the inlet 44 and outlet 54 is effectively minimized. This enables the inverted separator cup to be very effective in its separating action and at the same time, enables the tunnel-like formations 50 of the swirl plate 48 to impart the desired centrifugal swirling action to the incoming oil.

Further, in accordance with the present invention, means are provided on the upper inside wall of the upper housing part 22, extending peripherally therein for creating a controlled, mild turbulence in the oil entering through the inlet port 44, thereby to insure a good admixture of the impurities therein prior to said oil being guided downward into the lower portion of the upper housing part. Such turbulence-producing means comprises the low ribs 86 molded in the interior surface of the upper housing part and extending vertically. The ribs 86 are disposed above the swirl plate 48, as shown, in the most advantageous arrangement as at present understood.

It will now be understood that, as provided by the invention, a single molded plastic piece can constitute the upper housing part 22, and another single molded plastic piece can constitute the lower housing part 24, with the various details thereof as described above being molded as integral parts of said housing parts. This not only results in an economy of manufacture but also reduces the likelihood of leaks and cracks or seam openings which could occur if the housing parts were to be made of separate components that were assembled at a later time. The housing part 24 and its perforated plates 48, 60 and 62 constitute a unique and advantageous sub-assembly.

Relatively few, simple components are involved in producing the present improved oil purifier device. In addition to the two housing parts there are the three perforated plates carried by the standpipe of the lower housing part, and the discharge valve assembly 84 together with the bolts 42 for assembly of the housing. No complicated forms or assemblies are involved, and the fabrication after formation or molding of the components, can be readily carried out with unskilled, economical labor.

Advantageously the combined areas of the openings 59 in the swirl plate 48 can be commensurate with the area of the bore of the discharge standpipe 54, as can be understood.

The oil purifier device has been found to be extremely effective in maintaining clean the oil of an engine, as for example the engine of an automobile. Periodic cleanout of the settling chamber is quickly and easily carried out by merely unscrewing the discharge clean-out valve 84. No moving parts are involved, which can malfunction or get out of order. The purifier device is effective for other uses where oil is being forcibly pumped, as with fuel burners, or in handling and purifying spilled oil or oil and water mixtures that are being picked up by suction and discharged from the outlet of a pump, for instance.

Each and every one of the appended claims defines an aspect of the invention which is separate and distinct from all others, and accordingly each claim is to be treated in this manner when examined in the light of the prior art devices in any determination of novelty or validity.

Variations and modifications are possible without departing from the spirit of the claims.

What is claimed is:

1. A low-cost, mass-produced, reverse-flow oil purifier device utilizing reverse internal currents in a contained oil mass to remove impurities or water from oil fed to the device as from a spill or an oil supply that is circulating in the lubrication or fuel or other system of a piece of equipment, comprising in combination:
   (a) a sealed housing having upper and lower interfitting parts, said upper part having a top wall and an upper inside wall, and said lower part having a bottom wall,
   (b) said upper housing part having an oil inlet port adapted to direct the entering oil along said upper inside wall whereby the latter imparts
   a swirling movement to the oil, said upper inside wall tending to direct said entering oil in a circular path,
   (c) a straight open-top-end and open-bottom-end oil discharge standpipe attached to and supported by the bottom wall of the lower housing part and extending upward therefrom to a point adjacent the top wall of the upper housing part, (d) guide means comprising a plurality of thin, spaced-apart perforated plates supported in vertically spaced relation by and surrounding said standpipe, for guiding said swirling entering oil downward into the lower portion of the housing and simultaneously reducing the swirling movement thereof whereby a settling of impurities from said reduced-swirl oil can occur in said lower housing part, (e) said guide means enabling oil which is subject to said settling action in the lower housing part to pass upward around and closely adjacent the standpipe to the open top end thereof, thereby to ultimately flow downward in and through the standpipe and to be discharged from the bottom end thereof, and (f) an inverted cup means supported by the top wall of the upper housing part and extending downward toward and past the top end of the standpipe, tending to keep the swirling inlet oil separated from the rising, settle-purified discharge oil which latter is entering the open top end of the standpipe, said cup means having a bottom rim disposed at a level above the bottom area of the oil inlet port and below the top end of the standpipe and said standpipe being free of and unattached to said inverted cup means, and said inverted cup means having a wall which is only partially interposed between the open top end of the standpipe and the oil inlet port whereby a direct but restricted path for flow exists between said open top end and a portion of said oil inlet port, the upper portions of said inverted cup means defining a confined area for the rising, settle-purified oil which is to be discharged, said confined area being disposed above and in surrounding relation to the open top end of the standpipe, thus to minimize cross flow between the oil inlet port and the standpipe.

2. An oil purifier device as set forth in claim 1, wherein:
(a) the open top end of the standpipe is disposed about halfway into the said inverted cup means.

3. An oil purifier device as set forth in claim 1, wherein:
(a) the oil guide means accepts the swirling movement imparted to the entering oil and comprises a top swirl plate supported on the upper portion of the standpipe, having a plurality of tunnel-like openings in it, all facing in the same circumferential directions,
(b) said standpipe having an external shoulder on its outer side, against which said swirl plate is disposed and on which it is supported.

4. An oil purifier device as set forth in claim 1, wherein:
(a) the guide means surrounding and supported by the standpipe comprises a baffle plate having some openings to enable unsettled oil to flow downward through it, and having other openings to enable settle-purified oil to flow upward through it.

5. An oil purifier device as set forth in claim 1, wherein:
(a) said standpipe has exterior shoulders at a plurality of different levels,
(b) said perforated plates of the oil guide means having central apertures receiving the standpipe and being carried and supported thereby and resting on the respective shoulders of the standpipe,
(c) the uppermost of said plates constituting a swirl plate having plain openings in it and also tunnel-like openings in it, and the remainder of said plates having plain openings in them to enable unsettled oil to flow downward through them, and having other plain openings in them to enable settle-purified oil to flow upward through them.

6. An oil purifier device as set forth in claim 1, wherein:
(a) the oil guide means comprises an uppermost plate supported on the upper portion of the standpipe, having a plurality of tunnel-like openings in it all facing in the same circumferential directions,
(b) the open top end of the standpipe being disposed substantially half-way into the inverted cup means and said uppermost plate being disposed a distance below the bottom rim of the inverted cup means which distance is roughly equal to the extent of insertion of the standpipe into the inverted cup means.

7. An oil purifier device as set forth in claim 1, wherein:
(a) the upper housing part is cylindrical,
(b) said oil purifier device further including mounting lugs on the exterior of and integral with the upper housing part, extending in a common plane tangential to said housing part, for mounting the latter on a supporting structure in the engine compartment of an automobile.

8. An oil purifier device as set forth in claim 1, wherein:
(a) the upper housing part has a settling compartment in its lower portion, which constitutes a major fraction less than one-half of the total volume of the upper housing part,
(b) the bottom wall of the lower housing part having a cleanout device which is openable to discharge impurities removed from the settling oil.

9. An oil purifier device as set forth in claim 1, and further including:
(a) an interiorly-threaded boss on the exterior of the bottom wall of the lower housing part, communicating with the interior of said standpipe and constituting an outlet fitting for attachment to an oil line.

10. An oil purifier device as set forth in claim 1, wherein:
(a) the oil inlet port is disposed mostly at a level below the open top end of said standpipe,
(b) said inverted cup means which tends to keep separate the swirling inlet oil from the rising, settle-purified discharge oil havings its bottom rim generally at the mean level of the oil inlet port.

11. An oil purifier device as set forth in claim 1, and further including:
(a) means on the upper inside wall of the upper housing part, extending peripherally therein for creating a mild turbulence in the oil entering through said inlet port, thereby to insure admixture of the impurities therein prior to said oil being guided downward into the lower portion of the upper housing part.

12. An oil purifier device as set forth in claim 11, wherein:
(a) said turbulence-producing means comprises ribs disposed on the interior surface of the upper housing part.

13. An oil purifier device as set forth in claim 12, wherein:
   (a) said turbulence-producing means surrounds said inverted cup means and is disposed above the uppermost of the perforated plates.

14. An oil purifier device as set forth in claim 1, wherein:
   (a) the bottom rim of said inverted cup means is substantially at a level midway between the open top end of the standpipe and the uppermost perforated plate.

15. A low-cost, mass-produced, reverse-flow oil purifier device utilizing reverse internal currents in a contained oil mass to remove impurities or water from oil fed to the device as from a spill or an oil supply that is circulating in the lubrication or fuel or other system of a piece of equipment, comprising in combination:
   (a) a sealed housing having a transverse bottom wall and an inner upper wall,
   (b) said housing having upper and lower portions and having inside of its upper portion an oil inlet port adapted to direct entering oil along said inner upper wall whereby the latter imparts a swirling movement to the oil, said inner upper wall tending to direct said entering oil in a circular path,
   (c) a straight open-top-end and open-bottom-end oil discharge standpipe attached to and supported by the transverse bottom wall of the housing and extending upward therefrom to a location in the upper portion of the housing, the bottom portion of said standpipe passing through said bottom wall,
   (d) guide means comprising a plurality of thin, spaced-apart perforated plates supported in vertically spaced relation by and surrounding said standpipe, for guiding said swirling entering oil downward into the lower portion of the housing and simultaneously reducing the swirling movement thereof whereby a settling of impurities from said reduced-swirl oil can occur in said lower housing portion,
   (e) said guide means enabling oil which has been subjected to said settling action in the lower housing portion to pass upward around and closely adjacent the standpipe to the open-top-end thereof, thereby to ultimately flow downward in and through the standpipe and to be discharged from the open-bottom-end thereof, and
   (f) an inverted cup means in the upper portion of the housing and extending from a point above the open-top-end of the standpipe downward past said open-top-end, tending to keep the swirling inlet oil separated from the rising, settle-purified discharge oil which latter is entering the open-top-end of the discharge standpipe, said cup means having a bottom rim disposed at a level below the open-top-end of the oil discharge standpipe and said open-top-end of the discharge standpipe being spaced from said cup means, said inverted cup means having a wall which is interposed between the open-top-end of the discharge standpipe and the said oil inlet port whereby a restricted path for flow exists between said open-top-end and said oil inlet port, thus to minimize cross flow between the oil inlet port and the oil discharge standpipe.

16. An oil purifier device as set forth in claim 15, wherein:
   (a) the upper portions of said inverted cup means define a confined area for the rising, settle-purified oil which is to be discharged, said confined area being disposed above and in surrounding relation to the open-top-end of the oil discharge standpipe and in direct communication therewith.

17. A low-cost, mass-produced, reverse-flow oil purifier device utilizing reverse internal currents in a contained oil mass to remove impurities or water from oil fed to the device as from a spill or supply that is circulating in the lubrication, fuel or other system of a piece of equipment, comprising in combination:
   (a) a sealed housing having upper and lower interfitting parts, said lower housing part having a lateral bottom wall,
   (b) said upper housing part having an upper inner wall and a top wall, and having an oil inlet port adapted to direct the entering oil along said upper inner wall whereby the latter imparts a swirling movement to the oil, said upper inner wall tending to direct said entering oil in a circular path,
   (c) an open-top-end and open-bottom-end oil discharge standpipe attached to and supported by the lateral bottom wall of the lower housing part and extending upward therefrom to a point adjacent the top wall of the upper housing part,
   (d) guide means comprising a plurality of thin, spaced-apart perforated plates supported in spaced relation by and surrounding said standpipe, for guiding said swirling entering oil downward into the lower housing part and simultaneously reducing the swirling movement thereof whereby a settling of impurities from said reduced-swirl oil can occur in said lower housing part,
   (e) said guide means enabling oil which is subject to said settling action in the lower housing part to pass upward around and closely adjacent the standpipe to the open-top-end thereof, thereby to ultimately flow downward in and through the standpipe and to be discharged from the open-bottom-end thereof, and
   (f) an inverted cup means at the top wall of the upper housing part and extending downward past the open-top-end of the standpipe, tending to keep the swirling inlet oil separated from the rising, settle-purified discharge oil which latter is entering the open-top-end of the discharge standpipe, said cup means having a bottom rim disposed at a level above the said guide means and above the bottom area of the oil inlet port and below the open-top-end of the oil discharge standpipe, and said discharge standpipe being free of and unattached to said inverted cup means, and said inverted cup means having a wall which is only partially interposed between the open-top-end of the discharge standpipe and the oil inlet port whereby a direct but only restricted path for flow exists between said open-top-end and a portion of said oil inlet port, thus to minimize cross flow between the oil inlet port and the oil discharge standpipe.

18. In a low-cost, mass-produced, reverse-flow oil purifier device utilizing reverse internal currents in a contained oil mass to remove impurities or water from oil fed to the device as from a spill or an oil supply that is circulating in the lubrication or fuel or other system of a piece of equipment, a combined oil-guide and oil-discharge sub-assembly comprising in combination:
   (a) a lower housing part having a bottom wall,
   (b) an open-top-end and open-bottom-end oil discharge standpipe supported and carried by the lower housing part and extending upward from the said bottom wall thereof, (c) means supported on the upper end portion of said discharge standpipe, for imparting a downward swirling movement to oil entering through an inlet port adjacent said upper end portion, tending to force said entering oil downward toward said bottom wall and in a circular path, and (d) guide means surrounding and supported by said standpipe and disposed under said immediately-preceding means, for guiding said swirling entering oil further downward toward the bottom wall of the lower housing part and simultaneously reducing the swirling movement thereof whereby a settling of impurities from said reduced-swirl oil can occur on the bottom wall of said lower housing part, (e) said guide means enabling oil, which is subject to said settling action on the bottom wall of the lower housing part, to pass upward around and closely adjacent the standpipe to the open-top-end thereof, thereby to ultimately flow downward in and through the standpipe and to be discharged from the open-bottom-end thereof, (f) the means for imparting a downward swirling movement to the oil, and the said guide means comprising thin, spaced-apart perforated plates which are supported in spaced relation by and which surround said standpipe, (g) said standpipe having exterior annular shoulders on which the said perforated plates rest and by which they are supported.

* * * * *